Figure 5:
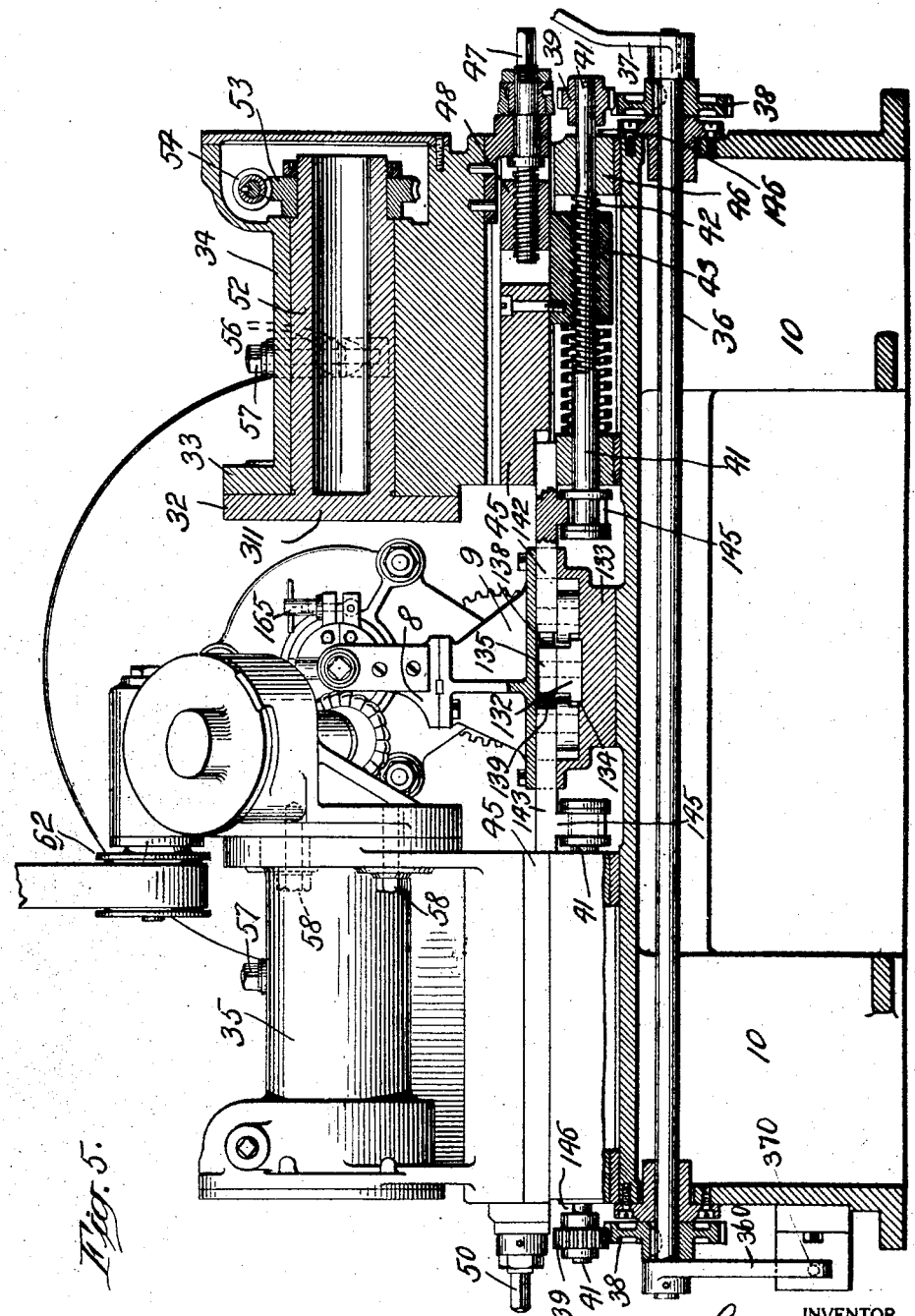

July 6, 1926.
L. S. WHITNEY
MILLING MACHINE
Filed Jan. 3, 1925
1,591,596
6 Sheets-Sheet 1
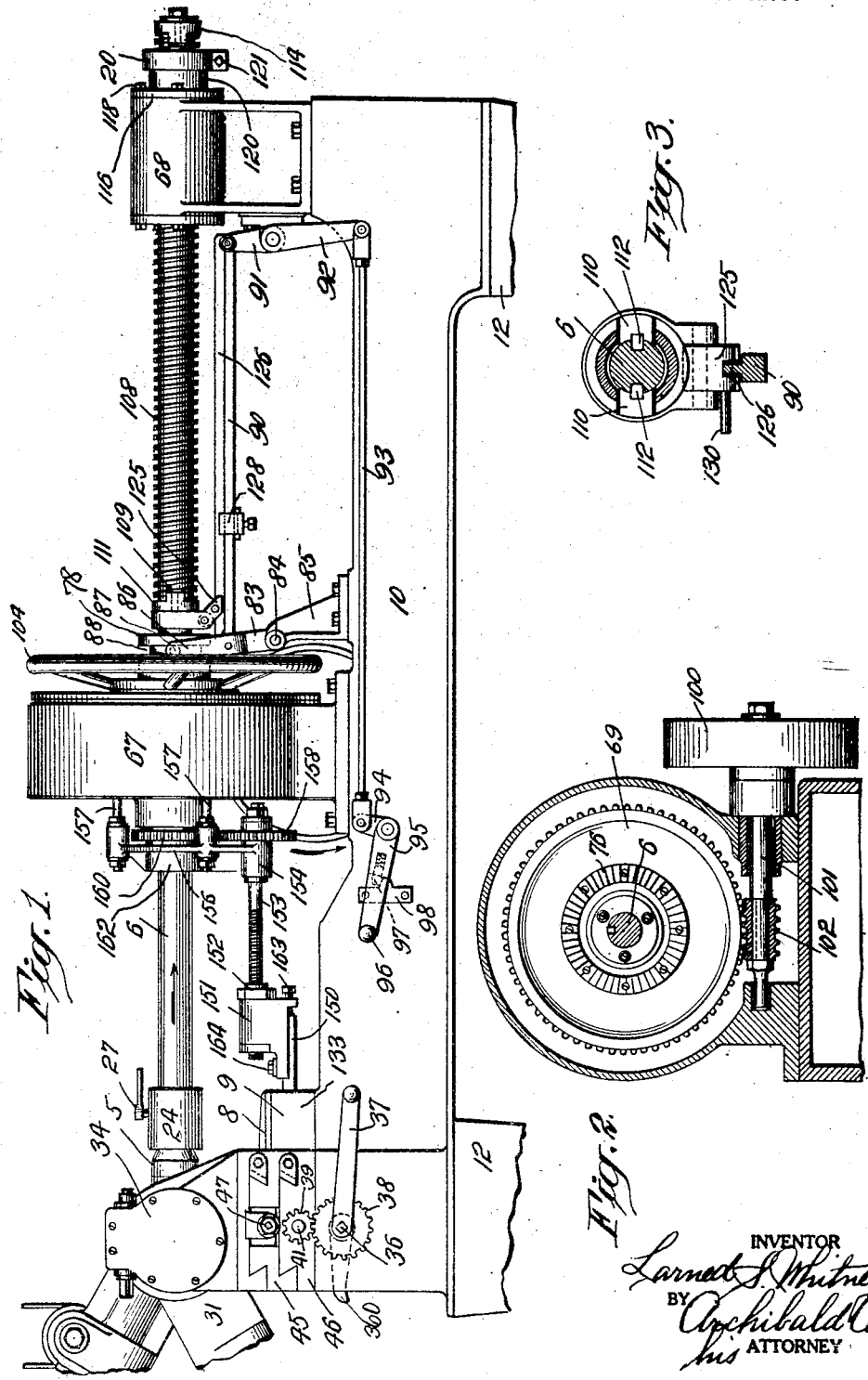

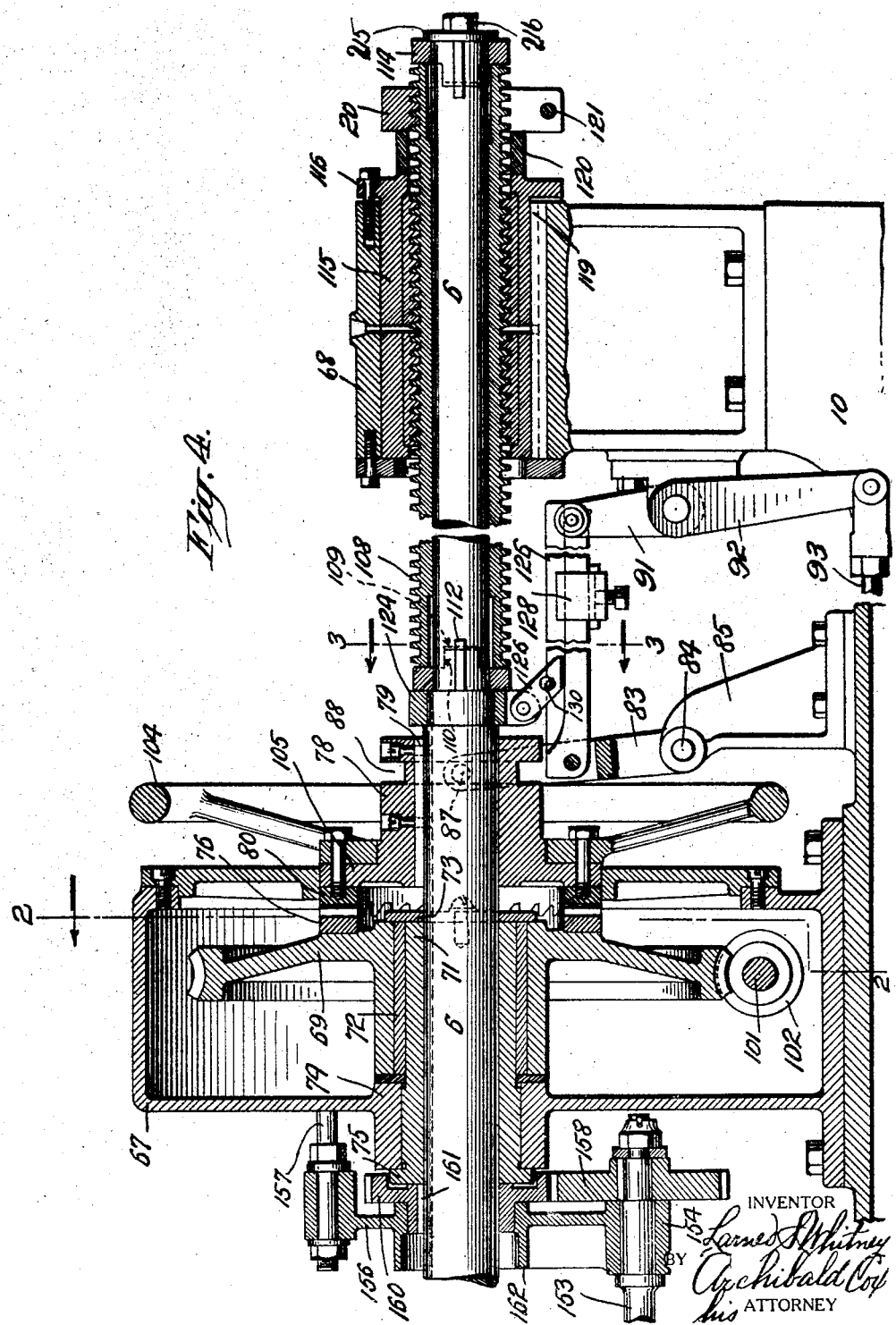

July 6, 1926.

L. S. WHITNEY

MILLING MACHINE

Filed Jan. 3, 1925

1,591,596

6 Sheets-Sheet 3

INVENTOR
Larned S. Whitney
BY Archibald Cox
his ATTORNEY

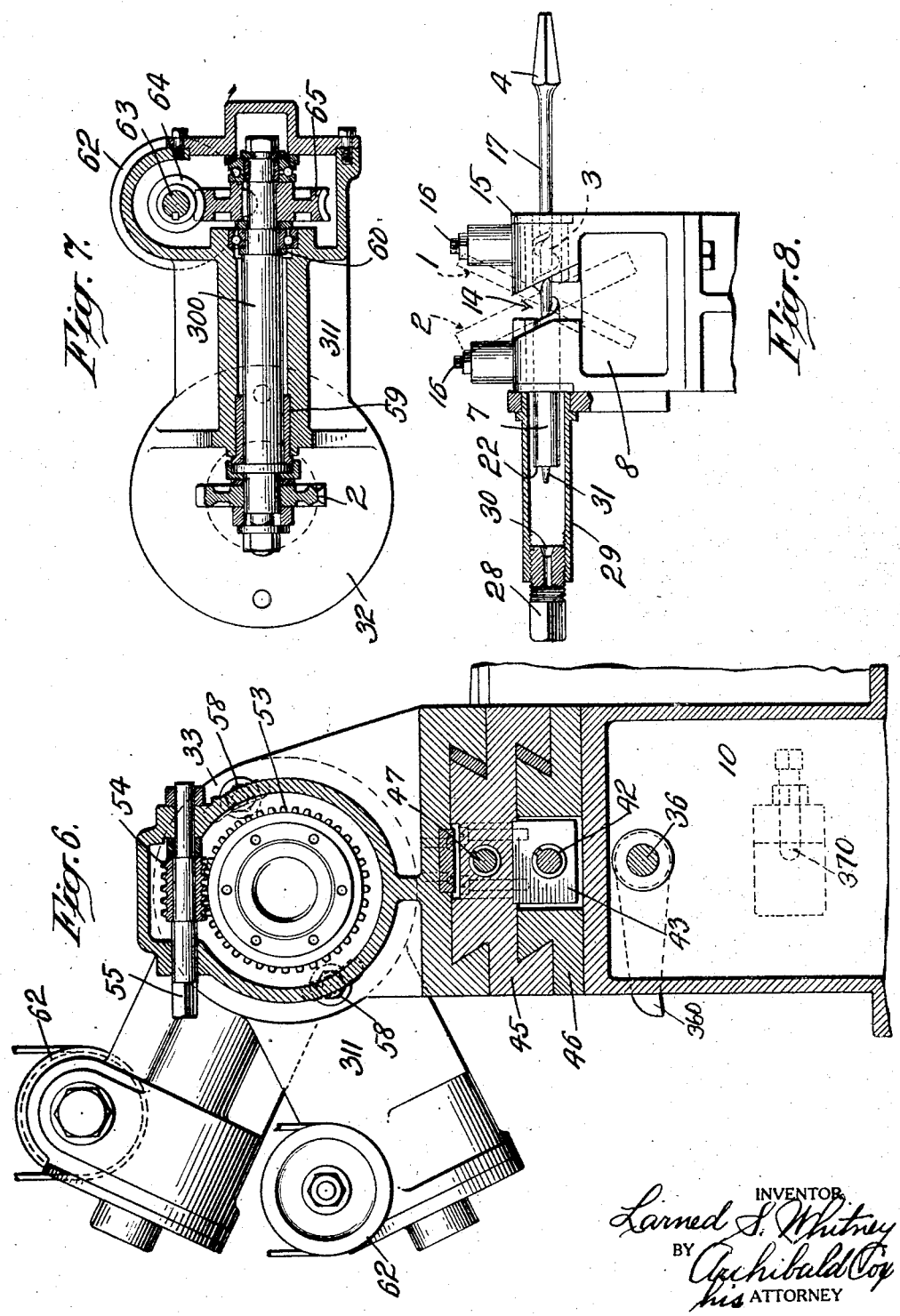

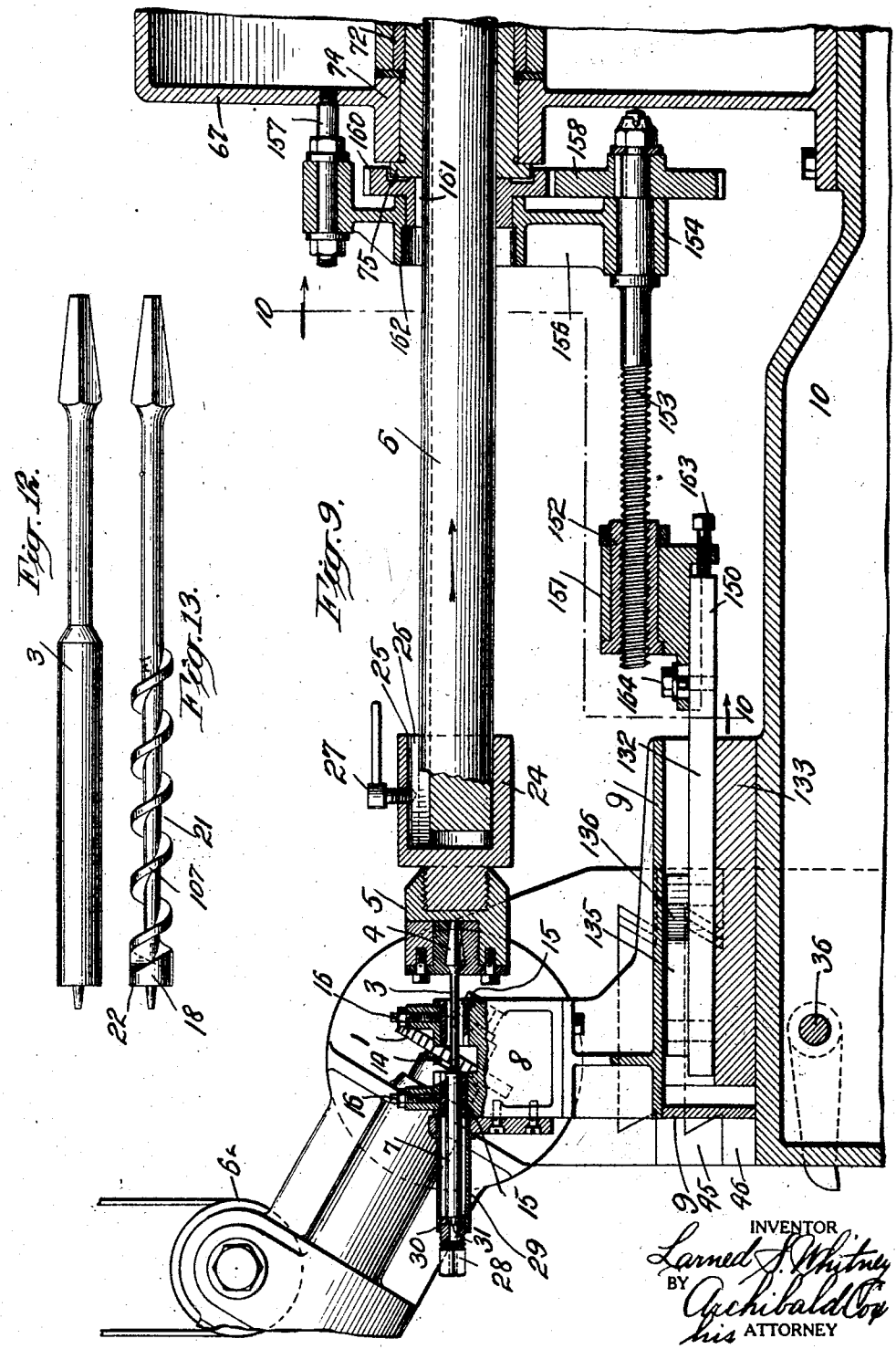

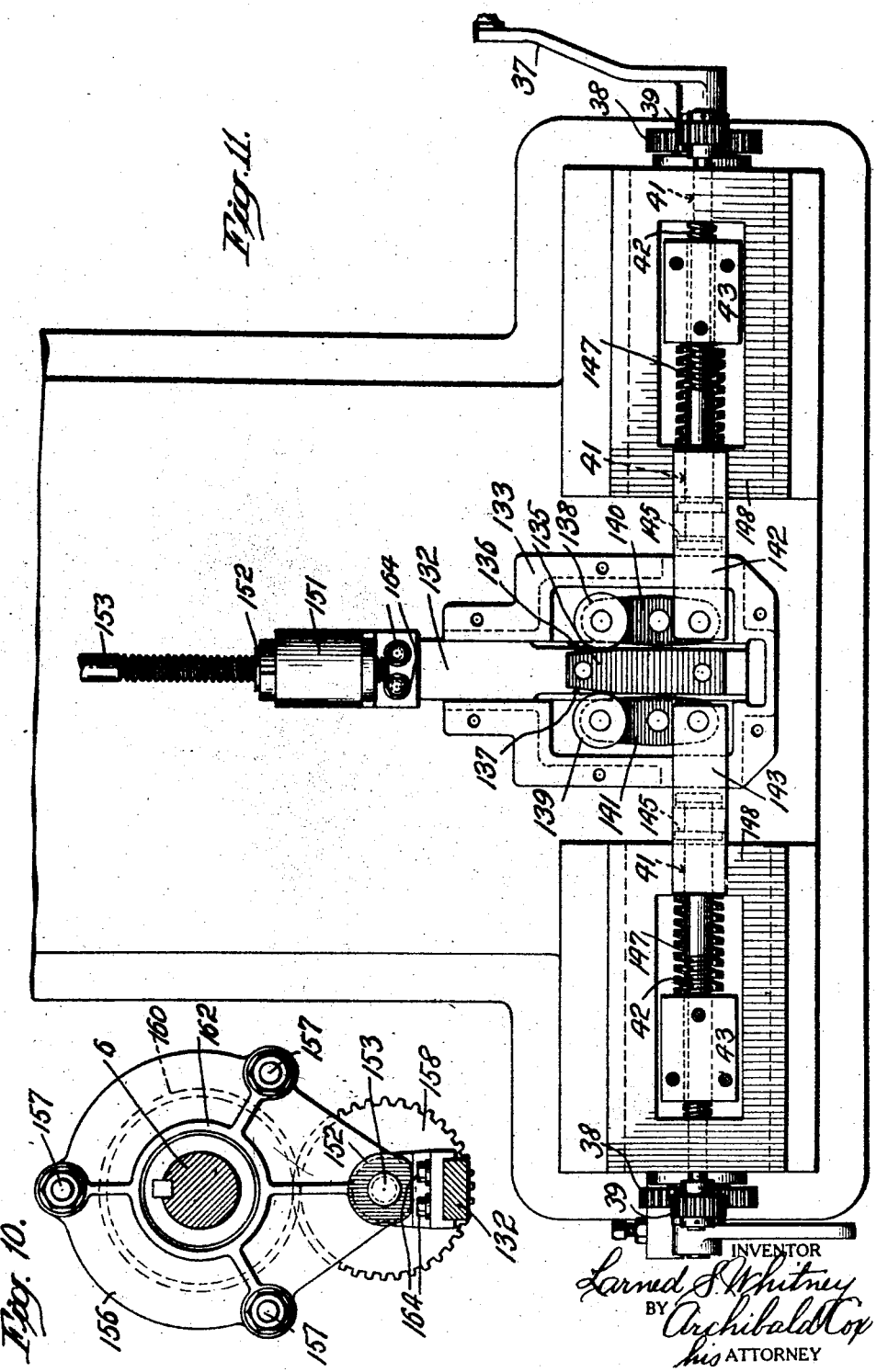

Patented July 6, 1926.

1,591,596

UNITED STATES PATENT OFFICE.

LARNED S. WHITNEY, OF FISKDALE, MASSACHUSETTS.

MILLING MACHINE.

Application filed January 3, 1925. Serial No. 411.

The invention relates to an improvement in milling machines, and more particularly to milling machines of the type especially adapted for cutting the spiral slot of auger bits and the like.

One object of the invention is to simplify and improve the construction and mode of operation of milling machines of this type in order that they may perform the spiral slot milling operation more efficiently and expeditiously. A further object of the invention is to simplify the construction of the milling machine so as to reduce the cost of producing the same. Another object of the invention is to provide milling machines of this type with means for moving the cutters relatively to each other during the slot cutting operation to cause the bottom of the spiral slot to be cut on a taper. Preferably the bottom of the slot will taper from the junction point between the body or spiral part of the bit and the shank toward the front or cutting end of the bit. These and other objects of the invention which will appear as the description proceeds are accomplished in the improved milling machine hereinafter described and particularly pointed out in the appended claims.

In the accompanying drawings illustrating the preferred form of the invention, Fig. 1 is a side elevation of the improved milling machine, with certain parts broken away; Fig. 2 is a section, on a reduced scale, taken along the line 2—2 of Fig. 4; Fig. 3 is a section taken along the line 3—3 of Fig. 4; Fig. 4 is a longitudinal vertical section, on an enlarged scale, through the rear end of the spindle and the means for imparting to it a simultaneous axial and rotative movement; Fig. 5 is an elevation (partly in section), on an enlarged scale, looking from the left in Fig. 1; Fig. 6 is a sectional elevation looking from the right in Fig. 5; Fig. 7 is a longitudinal section through one of the cutter heads or supports; Fig. 8 is a detail view of the bit supporting bushing or guide, illustrating the action of the cutters during the slot cutting operation; Fig. 9 is a longitudinal vertical section of the forward end of the machine showing the parts at the beginning of the milling operation; Fig. 10 is a section taken on the line 10—10 of Fig. 9 looking in the direction of the arrows; Fig. 11 is a longitudinal section through the cutter heads showing the means for causing the bottom of the spiral slot to be cut on a taper; Fig. 12 is a side elevation of a bit blank before the milling operation; and Fig. 13 is a similar view of the bit blank on the completion of the milling operation.

The improved milling machine as illustrated in the drawings comprises a pair of oppositely disposed cutters 1 and 2 which are angularly arranged as shown diagrammatically in Fig. 8. The angle between the cutters will be determined partly by the pitch of the spiral slot and partly by the bevel or undercut of the walls of the spiral rib or worm which forms and bounds the spiral slot. The cutters are mounted to be moved toward and from each other and are disposed on opposite sides of the bit blank 3 so as to operate simultaneously thereon, the cutter 1 acting as a roughing cutter and forming one side of the spiral rib, and the other cutter acting as a finishing cutter and forming the other side of the spiral rib. The roughing cutter 1, which is of less width than the finishing cutter 2, is set so as to cut somewhat in advance of the latter. The bit blank 3 is held by its tang 4 in the chuck 5 carried on the forward end of the feed spindle 6 which is mounted to have axial and rotative movements. During the slot cutting operation the body part 7 of the bit blank, in which part the spiral slot is cut, is supported in the bifurcated guide or bushing 8 mounted on the support 9 resting on the forward part of the frame 10 of the machine which is supported in position by the legs 12. The middle open part 14 of the guide 8 is provided to accommodate the cutters 1 and 2 as shown in Figs. 8 and 9. Replaceable wear bushings 15 are held in place in the guide 8 by the set screws 16.

Before the bit blank is ready for the slot cutting operation the shank part 17 is turned down and the tang 4 formed thereon. The spiral slot is cut from the junction of the body part 7 with the shank 17 toward the forward or cutting end of the bit. The spiral slot terminates short of the forward end of the bit to leave enough stock 18 (Fig. 13) out of which to form the lips or cutting edges and the spurs. When the bit blank has been placed in the chuck and the latter tightened, the feed spindle 6 is moved forward rapidly to advance the bit blank into position (as shown in Fig. 9) for the beginning of the slot cutting operation. The limit of the forward movement of the feed spindle is determined by the stop 20 mounted on the rear end of the spindle, the construction and function of this part being described more in detail hereinafter.

In order that the spiral slot 21 (Fig. 13) may always terminate at the same point with respect to the end 22 of the bit blank so as always to leave the same amount of stock 18 out of which to form the lips and spurs, the chuck 5, which holds the bit blank, is mounted on the forward end of the spindle 6 so as to have a limited axial movement thereon. For this purpose the cup-shaped head 24 is provided. In the inner periphery of the head 24 is a slot 25 which loosely fits over the key 26 projecting upwardly from the forward end of the spindle 6. The handled screw 27 is provided to hold the head 24 in adjusted position on the spindle. When a fresh bit blank is placed in the chuck and the spindle 6 is run forward the screw 27 is loosened. The operative then advances the spindle 6 until the forward end 22 of the bit blank encounters the hollow adjusting screw 28 threaded into the forward end of the screw support 29 projecting forwardly from the guide 8. By turning the screw 28 in its support 29 the amount of stock 18 to be left for the lips and spurs is determined. The inner end of the screw 28 is countersunk at 30 to accommodate the screw tip 31 of the bit blank. When the forward end 22 of the bit blank encounters the inner end of the adjusting screw 28 the operative tightens down on the screw 27 and the bit blank is then ready for the slot cutting operation. The operative next advances the cutters toward each other until they touch or are in close proximity to the shank 17. All the parts being set for the milling operation, the operative connects the feed spindle with the power actuating means, by which it is caused to travel in the direction away from the cutters, at the same time being rotated. This combined axial and rotative movement of the spindle and bit causes the cutters to form a spiral slot of the requisite pitch in the body part 7 of the bit. On the completion of the milling operation, the operative disengages the cutters from the bit and then manually actuates the spindle to entirely withdraw the bit from the bushing 8.

The cutter 2 is mounted on the end of a spindle 300 journaled in a head 311 adjustably secured by its flange 32 to the flange 33 of a housing 34 which is moved toward and from the bit blank synchronously with the housing 35 of the cutter 1 by means of the feed shaft 36 provided at its forward end with the handle 37. The arm 360 secured on the rear end of the shaft 36 encounters the adjusted screw 370 and so determines the inward movement of the cutters.

On the forward end of the shaft 36 is a gear 38 which meshes with a pinion 39 mounted on the outer end of a screw shaft 41 provided with a worm 42 which passes through a lug 43 secured to the underside of a dove-tailed slide 45 which slides toward and from the bit blank on the dove-tailed guide 46 in which the shaft 41 is journaled. In order that the houisng 34 may be adjusted toward and from the bit blank independently of the housing 35, it is provided with a screw 47 which passes through the block 48 extending transversely across the slide 45. When the screw 47 is turned the housing 34 is moved relatively to the upper dove-tailed part of the slide 45, the base of the housing being dove-tailed to fit thereon. All these parts for supporting the cutter 2 and moving it toward and from the bit blank have their counter parts for supporting and moving the cutter 1 toward and from the bit blank. It will thus be understood that when the feed shaft 36 is turned the cutters are advanced toward or retracted from the bit blank synchronously, and that when the screws 47 and 50 are turned the cutters are advanced toward and retracted from the bit blank independent of each other.

The head 311 is provided with a tubular bearing 52 which is disposed at right angles to the longitudinal axis of the head and is received in a bore in the housing 34. On the forward end of the bearing 52 is mounted a worm gear 53 which meshes with the worm 54 having a projecting end 55 which is squared to receive a handle by which the angular position of the cutter 2 may be adjusted. The housing 34 is provided with split blocks 56 (Fig. 5), and when the cutter has been adjusted angularly the bolt 57 is tightened to close the blocks on the bearing 52. The bolts 58 passing through the flanges 32 and 33 are then tightened to secure the head 311 in adjusted position. The spindle 300 on which the cutter 2 is mounted is journaled in bearings 59 and 60 in the head 311, as shown in Fig. 7. The cutter 2 is driven by a pulley 62 mounted on the outer end of a shaft 63 on which is fixed a worm 64 which meshes with a worm gear 65 mounted on one end of the cutter spindle 300. The parts for supporting and actuating the cutter 1 are constructed exactly like the parts for supporting and actuating the cutter 2.

The feed spindle 6, which carries on its forward end the chuck 5, is mounted to travel axially and at the same time to have a rotative movement so that the cutters will form a spiral slot in the body portion of the bit. For this purpose the feed spindle is mounted in the housing or casing 67, the rear end of the spindle being supported in the nut casing 68. In the housing 67 is enclosed a worm gear 69 mounted to turn freely on the sleeve 71 which tightly embraces the feed spindle. Interposed between the hub of the worm gear 69 and the periphery of the sleeve 71 is a bushing 72. The worm gear 69 is held against axial movement between the ring 73 secured to one end of the sleeve 71 and the hub-like part 74 of the housing 67. The sleeve 71 is held against axial movement by the engagement of its flanged end 75 with the projecting part of the hub 74. The rear face of the worm gear 69 is provided with a ring 76 which is toothed to constitute a clutch section.

A clutch member 78 adapted to cooperate with the clutch section 76 is mounted to slide on the feed spindle 6 but is held against rotative movement relatively thereto by the key and spline connection 79. The clutch member 78 is provided with the clutch section 80 which is adapted to come into locking engagement with the clutch section 76 of the worm gear 69 when the clutch member 78 is moved axially on the spindle 6. Means for sliding the clutch member 78 into and out of engagement with the worm gear 69 comprises a yoke 83 pivoted at 84 on an upright 85 supported on the frame 10. The two upwardly extended arms 86 of the yoke 83 have inwardly projecting pins 87 which are loosely received in the groove 88 in the clutch member. One end of the rod or link 90 is pivotally connected with the yoke 83 and the other end of the link 90 is pivoted to the upper arm of a lever 91, the lower arm 92 of which is pivotally connected by the link 93 with the arm 94 of the lever 95 pivotally mounted on the front of the machine. The lever 95 is provided with a handle 96 by which the yoke 83 is moved in a direction to bring the clutch 78 into locking engagement with the worm gear 79. A spring pressed latch 97 by engagement with the detent 98 holds the handle 96 in raised position with the clutch 78 and worm gear 69 locked.

During the slot cutting operation the spindle 6 is driven by power which is transmitted to it by the pulley 100 mounted on the outer end of a shaft 101 on which is fixed the worm 102 which meshes with the worm gear 69.

In order that the spindle 6 may be moved relatively rapidly to advance the bit quickly into position for the beginning of the milling operation, and in order that the bit may be quickly withdrawn from the guide 8 upon the completion of the milling operation, the hand wheel 104 is provided, the hub of which is secured to the flange-like part 105 of the clutch 78.

The width of the spiral 107 (Fig. 13) is determined by the pitch of a threaded sleeve 108 removably mounted on the rear end of the feed spindle 6. The forward end of the threaded sleeve 108 is slotted at 109 to engage with the lugs 110 of a collar 111 fixed on the spindle 6 by the keys 112. On the outer extremity of the spindle 6 is a collar 114 which has a similar connection with the spindle. The collar 114 is held in place by the washer 215 and cap screw 216. This construction permits the threaded sleeve 108 to be removed and another substituted when it is desired to have a spiral of different thickness or width. The threaded sleeve 108 passes through a threaded nut 115 mounted in the casing or head 68. The nut 115 is held against axial and rotative movement in the head 68. For this purpose the flange 116 of the nut is provided with the cap screws 118 which screw into the head 68, and the lower side of the periphery of the nut 115 is connected with the head 68 by the key and slot 119.

When the operative has placed a bit in the chuck and has turned the hand wheel 104 to advance the bit into position for the beginning of the milling operation, the spindle 6 continues to travel forward until the collar 120 and nut 20 encounter the rear end of the flange 116 of the nut 115, as shown in Fig. 4. The nut 20 is threaded on to the outer end of the sleeve 108 and is split so that it may be adjusted on the sleeve 108, then securely fastened in adjusted position by tightening the screw 121. By adjusting the nut 20 axially on the sleeve 108 the extent to which the spindle 6 may be advanced toward the cutters is determined.

The length of the spiral slot to be cut in the bit, or rather the amount of stock 18 to be left between the forward end of the slot and the end 22 of the bit is determined by a stop device comprising a collar 124 secured to the spindle 6 at the inner end of the threaded sleeve 108. Pivotally connected with the lower side of the collar 124 is a bifurcated latch 125 arranged to loosely embrace and slide on the upper part 126 of the link 90. Secured to the link 90 is a stop or dog 128 interposed in the path of travel of the latch 125. When the latch 125 encounters the stop 128 it moves the link 90 to the right and the link 93 to the left (viewing Fig. 1), thereby disengaging the clutch 78 from the worm gear 69 and forcing the lever 95 out of engagement with its detent 98, thus disconnecting the spindle 6 from its power actuating means. In case the operative should desire to permit the spindle to continue to travel in its reverse direction (as indicated by the arrow in Fig. 1) when the latch 125 arrives at the stop 128 without disturbing the position of the stop 128, he will lift the latch 125 by means of the pin 130.

In bits which are produced mainly by forging it is customary to have the bottom of the spiral slot taper from the junction of the spiral and the shank toward the front or cutting end of the bit. It has been found desirable in producing auger bits entirely by machine to employ this same feature, that is, to have the bottom of the spiral slot taper from the point where the spiral meets the shank toward the front or cutting end of the bit. The mechanism provided in the present invention for accomplishing this purpose comprises a cam plate 132 mounted to slide in a housing 133 on which the upright 9 is supported. The housing 133 is located between the cutter supports, and the guideway 134 for the cam plate 132 extends at right angles to the axis of the feed shaft 36 and of the other parts connected with the cutter supports. On the cam plate 132 is fixed a cam 135 having the lateral cam surfaces 136 and 137 which are engaged by the cam rolls 138 and 139, respectively, mounted on the inner ends of the levers 140 and 141 pivoted in the bottom of the housing 133. The other ends of the levers 140 and 141 are pivotally connected with the sliding bars 142 and 143 which are mounted to slide in the upper part of the housing 133 and in adjacent recesses formed in the inner ends of the slides 45. From each sliding bar depends a lug 145 which loosely engages with the inner end of its corresponding screw shaft 41, as shown in Figs. 5 and 11. The screw shafts 41 are mounted to have considerable end play or lost motion, as is indicated by the space 146 between the gear 39 and the adjacent part of the guide 46. The heavy coiled springs 147 interposed between the inner ends 148 of the guides 46 and the blocks 43 serve to yieldingly hold the cam rolls 138 and 139 against the cam surfaces 136 and 137. When the cam plate 132 is drawn between the cam rolls the tapered cam surfaces 136 and 137 force the cam rolls apart and thereby cause the cutter supports and the cutters to approach toward each other.

The cam plate 132 is moved relatively to the cam rolls 138 and 139 during the slot cutting operation. For this purpose the end 150 of the cam plate projecting from the housing 133 is provided with a head 151 in which is mounted a nut 152 which receives a screw 153, journaled in a bearing 154 supported from a frame work 156 which in turn is supported from the housing or casing 67 by the studs 157. On the outer end of the screw 153 is mounted a gear 158 which meshes with a gear 160 having a key and spline connection 161 with the spindle 6 so as to be driven thereby and at the same time to permit the spindle to move axially relatively thereto. The gear 160 is held against axial movement between the flange 75 of the bushing 73 and the hub-like part 162 of the frame work 156. The head 151 is adjustably secured to the end 150 of the cam plate 132 so as to adjust the cam surfaces 136 and 137 relatively to the cam rolls 138 and 139, the screw 163 being provided for this purpose. The cap screws 164 secure the head 151 in adjusted position on the cam plate 132.

It will be noted from a consideration of Fig. 11 that the tapering cam surfaces 136 and 137 are relatively short compared with the length of the spiral slot 21, as shown in Fig. 13. This difference in length between the spiral slot 21 and the tapered cam surfaces 136 and 137 is accounted for by the fact that while the spindle 6 is traveling a distance equal to the length of the spiral slot 21 the gears 158 and 160 and the screw 153 cause the cam plate 132 to be moved only a distance substantially equal to the effective or working parts of the cam surfaces 136 and 137.

It will conduce to clearness of understanding of the invention to briefly recapitulate the mode of operation of the milling machine as a whole. It is assumed that the feed spindle 6 is retracted to a position permitting the operative to remove the bit which has just been milled and place a fresh bit blank in the chuck 5, and clamp it therein by tightening down on the hand screw 165. Under these conditions the latch 125 is positioned to the right of the stop dog 128 (viewing Fig. 1). The fresh bit blank having been clamped in the chuck 5 the operative loosens the screw 27 and spins the hand wheel 104 to advance the spindle 6 rapidly to the limit of its leftward or forward travel, the latch 125 rising over the stop dog 128 and dropping in front thereof. The operative then manually advances the chuck 5 with the bit therein until the forward end of the bit encounters the adjusting screw 28. Thereupon he tightens up the screw 27 and turns the handle 37 in a counter clockwise direction until the arm 360 encounters the stop screw 370. The parts are now in position for the beginning of the milling operation. The machine is started by raising the handle 96 thereby moving the clutch 78 into locking engagement with the worm gear 69, the engagement of the latch 97 with the detent 98 holding the handle 96 in raised position and the clutch in engagement with the worm gear. The spindle 6 now begins and continues its reverse axial and rotative movement, as shown by the arrow in Fig. 1, until the latch 125 encounters the stop dog 128 and disengages the clutch 78 from the worm gear 69. The operative then moves the handle 37 in a clockwise direction to disengage the cutters from the work. He then spins the hand wheel 104 in a reverse direction to entirely withdraw the milled bit from the guide 8, at the same time lifting the latch 125 to clear the stop dog 128.

Having thus described the invention, what I claim as new is:—

1. A machine for milling the spiral slot of an auger bit comprising, a pair of cutters mounted to be moved toward and from each other, a spindle, a chuck on the forward end of the spindle for holding the bit to be milled, means for imparting a simultaneous axial and rotative movement to the spindle during the milling operation consisting of a screw fixed on the spindle, a nut held against axial and rotative movement through which the screw passes, a worm gear loosely mounted on the spindle, a clutch member slidingly (but not rotatively) mounted on the spindle, means for engaging the clutch member with the worm gear, and a driven worm meshing with the worm gear, a tapered cam, a cam roll connected with each cutter arranged to engage the cam, and connections between the cam and the spindle to move the cam to move the cutters relatively to each other to cause the bottom of the spiral slot to be cut on a taper.

2. A machine for milling the spiral slot of an auger bit comprising, a pair of oppositely disposed, angularly arranged cutters, a head on which each cutter is mounted, manual means for moving the heads toward each other to bring the cutters to position for beginning the milling operation, said heads being mounted to move independently of the manual means, a cam, a lever connected with each head and carrying a roll in engagement with the cam, a spindle, a chuck carried by the spindle for holding the bit to be milled, means for imparting a simultaneous axial and rotative movement to the spindle, and connections between the cam and the spindle consisting of a nut connected with the cam, a screw engaged in the nut, a gear carried by the screw and a gear on the spindle.

3. A machine for milling the spiral slot of an auger bit comprising, a spindle, a chuck carried by the spindle for holding the bit to be milled, a cutter, a slidable head on which the cutter is mounted, a manually operated screw for moving the cutter toward and from the bit, said head having a certain amount of movement independent of its actuation by the screw, a spring for normally pressing the head in a direction from the bit, a cam, connections between the cam and the cutter head, means for imparting a simultaneous axial and rotative movement to the spindle, and connections between the cam and the spindle by which the cam is actuated to cause the head to move relatively to the bit during the milling operation to cause the bottom of the slot to be cut on a taper.

4. A machine for milling the spiral slot of an auger bit comprising, a spindle, a chuck carried by the spindle for holding the bit to be milled, a pair of oppositely disposed, angularly arranged cutters, a slidable head on which each cutter is mounted, manually operated screws for moving the heads toward each other to bring the cutters to position for beginning the milling operation, said screws permitting the heads to be moved a certain distance independently thereof, springs for normally forcing the heads in directions away from each other, a cam, a lever connected with each head and carrying a roll in engagement with the cam, means for imparting simultaneous axial and rotative movements to the spindle, and connections between the cam and the spindle consisting of a nut connected with the cam, a screw engaged in the nut, a gear carried by the screw, and a gear on the spindle.

5. A machine for milling the spiral slot of an auger bit comprising, a spindle, a chuck carried by the spindle for holding the bit to be milled, a pair of oppositely disposed, angularly arranged cutters, a slidable head on which each cutter is mounted, a manually operated screw for moving each head toward and from the bit, said screw permitting the head to be moved toward and from the bit independently thereof, a spring for forcing each head in a direction away from the bit, means for imparting simultaneous axial and rotative movements to the spindle, and means for moving the heads independently of their screws during the milling operation to cause the bottom of the slot to be cut on a taper.

6. A machine for milling the spiral slot of an auger bit comprising, a pair of cutters mounted to be moved towards and from each other, a spindle, a chuck on the forward end of the spindle for holding the bit blank to be milled, means for imparting a simultaneous axial and rotative movement to the spindle during the milling operation consisting of a screw fixed on the spindle, a nut held against axial and rotative movement through which the screw passes, a worm gear loosely mounted on the spindle, a clutch member mounted to slide on the spindle, means for engaging the clutch member with the worm gear, a worm meshing with the worm gear, means for driving the worm, two levers pivoted on a stationary part of the machine and connected at one end with the cutters respectively, a cam roll mounted on the free end of each lever, a tapered cam arranged to be engaged by the cam rolls and to have a sliding movement between them, and connections between the cam and the spindle whereby the levers are actuated to cause the cutters to move relatively to each other to cause the bottom of the spiral slot to be cut on a taper.

LARNED S. WHITNEY.